G. W. SCHLICHTEN.
BEARING APPARATUS.
APPLICATION FILED DEC. 11, 1918.
1,361,187.
Patented Dec. 7, 1920.
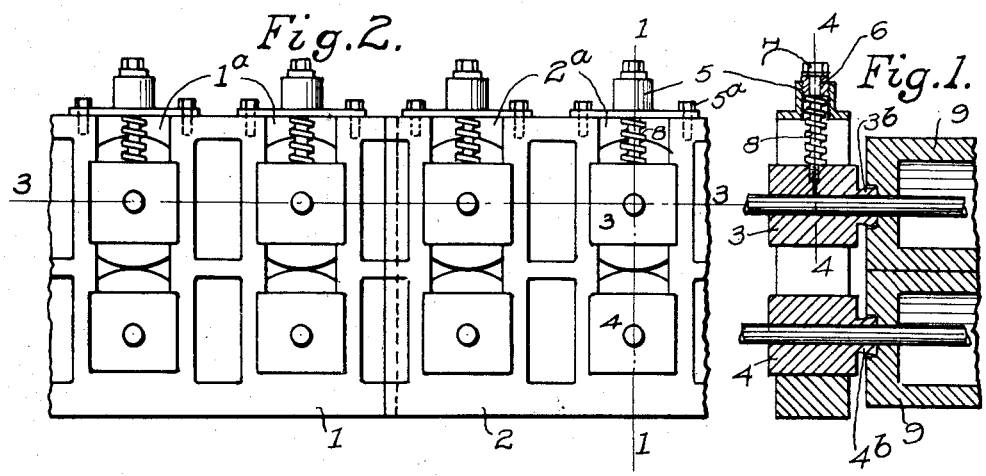
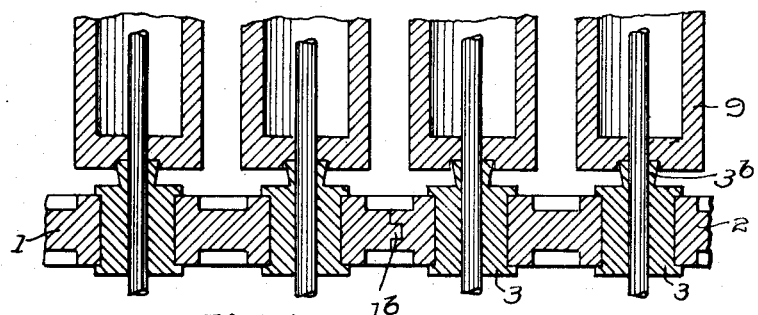
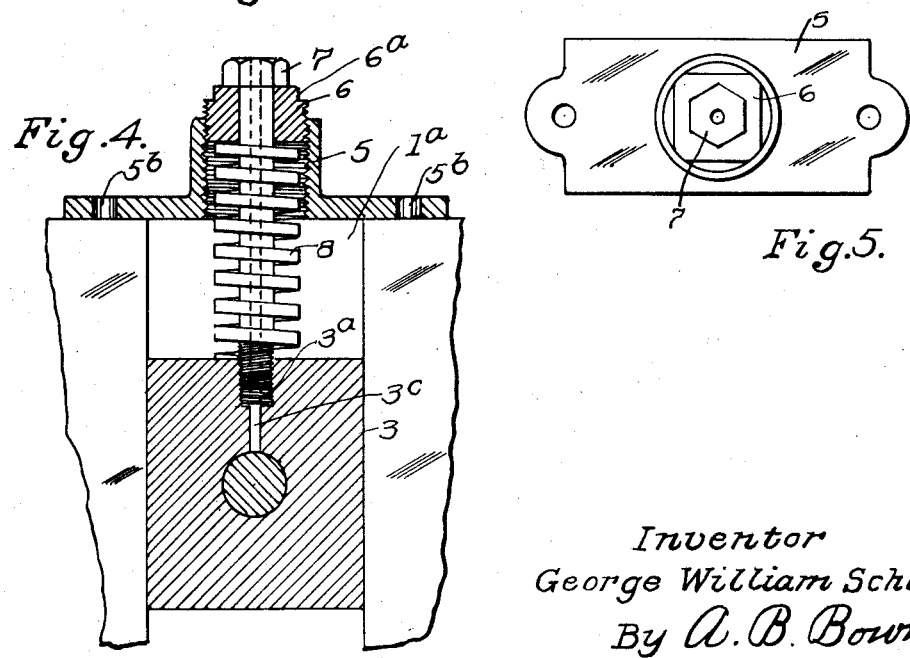
Inventor
George William Schlichten
By A. B. Bowman
Attorney

UNITED STATES PATENT OFFICE.

GEORGE WILLIAM SCHLICHTEN, OF SAN DIEGO, CALIFORNIA.

BEARING APPARATUS.

1,361,187.   Specification of Letters Patent.   Patented Dec. 7, 1920.

Original application filed December 27, 1916, Serial No. 139,181. Divided and this application filed December 11, 1918. Serial No. 266,257.

*To all whom it may concern:*

Be it known that I, GEORGE WILLIAM SCHLICHTEN, a citizen of the United States, residing at San Diego, in the county of San Diego and State of California, have invented certain new and useful Improvements in Bearing Apparatus, of which the following is a specification.

My invention relates to bearings and bearing apparatus more particularly bearings and bearing apparatus to be used in connection with revolving apparatus such as fiber decorticating machines for treating fibers and fiber bearing plants and materials and the primary object of this invention is: to provide for the division of my application for means for treating fiber bearing plants, filed Dec. 27, 1916, Serial No. 139,181, which application was divided and the claims for the present bearing apparatus canceled from said former application and the objects of this invention are first, to provide a bearing of this class in which fiber which comes in contact with the bearing will not wind on the shaft as is ordinarily the case but will tend to move toward a stationary bearing by reason of the taper of the projection on said bearing; second, to provide a bearing of this class which will prevent dirt and dust getting on the shaft; third, to provide bearings for rolls and other revolving fiber plant treating apparatus for adjusting the relative position for said rolls or other apparatus and providing a spring tension which will hold the parts of said apparatus in their proper relative position to each other under certain spring tension and will permit them to spread when subjected to extra pressure; fourth, to provide bearings of this class which are adjustable to permit the proper regulation and control of the relative positions of the rolls or other revolving apparatus; fifth, to provide means for lubricating said bearings; and sixth, to provide bearings and bearing apparatus of this class which are simple and economical of construction, durable, easy to operate, easy to adjust, easy to install, and will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary sectional view through 1—1 of Fig. 2, showing the two bearings in position and the rolls in connection therewith; Fig. 2 is a side elevational view of a frame support showing several of my bearings in position therein; Fig. 3 is a sectional view through 3—3 of Fig. 2; Fig. 4 is a detailed enlarged sectional view through 4—4 of Fig. 1, showing the adjustable bearings on an enlarged scale; and Fig. 5 is a top or plan view thereof.

Similar characters of reference refer to similar parts and portions throughout the several views of the drawings.

The supporting frames 1 and 2, bearings 3 and 4, cap 5, plug 6, bolt 7, spring 8, and rolls 9 constitute the principal parts of my bearing apparatus.

The frames 1 and 2 are preferably metallic and where the two frame supports 1 and 2 join, the frame 1 is provided with a tongue $1^b$, which rests in a groove in the frame 2 so they are held rigidly in alinement with each other by means of said tongue and groove joint, and each of the frames 1 and 2 are provided with a plurality of vertical slots $1^a$ and $2^a$ in which are slidably mounted the bearings 3 and 4. The bearing 4 is adapted to rest in the bottom of said slots and the bearing 3 is provided with a central threaded hole $3^a$ in its top side adapted for the bolt 7 to screw therein, and said bolt is supported at its upper end by means of the plug support 6 which is threaded externally adapted for the internal threads in the cap 5. This plug 6 is provided with a central hole adapted for the bolt 7 and is polygon shaped at $6^a$, adapted for a wrench, to facilitate the turning of said plug in said cap 5. This cap 5 is adapted to fit over the slot $1^a$ or $2^a$ and is held in position on the frame by means of the bolts $5^a$ in holes $5^b$ in said cap. Mounted between the plug 6 and the bearing 3 and over the bolt 7 is a compression spring 8 tending to hold said bearing 3 in certain specified relation with the plug 6 but adapted to yield when extraordinary pressure is brought to bear between the rolls permitting the bolt 7 to raise in the plug 6 but returning to its original position as soon as the extra pressure is relieved.

It will be here noted that the bolt 7 holds the bearing 3 up and the spring 8 tends to hold it down and that the position of the bearing 3 may be readily changed by turning the plug 6 in the cap 5.

These bearings 3 and 4 are each provided with annular tapering extensions $3^b$ and $4^b$ which set into recesses in the ends of the rolls 9 adjacent the shaft so that the shaft is not exposed to the fiber material and will not wrap thereon and said shaft will be kept free from dirt or dust and if any fiber should fall upon the extension it would work itself toward the small portion of the extension on the bearing because of the shape of the extension.

Though I have shown and described a particular construction, combination and arrangement of parts and portions and certain applications of my bearings I do not wish to be limited to this particular construction, combination and arrangement nor to the applications disclosed, but desire to include in the purview of my invention the construction, combination and arrangement substantially as set forth in the appended claims.

It is obvious that with this construction, there is provided a bearing and bearing apparatus in which a portion of the bearing extends into the roll which portion is tapered thus reducing the liability of wrapping to a minimum, that dirt and dust will not get on the shaft and accumulate thereon, that the bearings 3 and 4 may be readily adjusted to certain relative positions from each other thus adjusting the relative positions of the rolls, that the upper bearing being held down by the compression spring will yield under extraordinary pressure between the rolls, that the bearing 3 is lubricated through a hole centrally in the bolt 7 and with a communicating oil channel $3^c$ to the shaft.

Having thus described my invention what I claim as new and desire to secure by Letters Patent is:

1. A bearing member, including a shaft, a revoluble member secured on said shaft provided with an annular recess in its end surrounding said shaft and a bearing member provided with a tapered projecting portion, the larger end of which extends into said recess.

2. A bearing apparatus, including a revoluble member provided with a shaft and provided with an annular recess surrounding said shaft and a bearing member provided with an extended tapering projection with its larger portion extending into said recess.

3. A bearing apparatus, including housings, each of which is provided with a plurality of notches therein, a pair of bearings shiftable relatively to each other, in each of said notches, means for supporting one of said bearings relatively to the other, including a hollow bolt member with one end screwed into one of said bearings and its other end supported upon a plug, a cap extended across said slot in which said plug is adjustably mounted and a compression spring between said plug and said bearing surrounding said bolt.

4. A bearing apparatus including a plurality of housings each provided with a plurality of notches therein, a pair of bearings shiftable relatively to each other from and toward each other and shiftable with each other, mounted in each of said notches, means for supporting one of said bearings in said slot, including a bolt with one end secured in said bearing, a cap mounted across said slot, a plug adjustably mounted in said cap in which said bolt is supported and yieldable means surrounding said bolt between said plug and said bearing.

In testimony whereof, I have hereunto set my hand at San Diego California this 4th day of December 1918.

GEORGE WILLIAM SCHLICHTEN.